United States Patent
Thompson et al.

(10) Patent No.: US 10,579,354 B2
(45) Date of Patent: Mar. 3, 2020

(54) METHOD AND SYSTEM FOR RAPID DEPLOYMENT AND EXECUTION OF CUSTOMIZED FUNCTIONALITY ACROSS MULTIPLE DISTINCT PLATFORMS

(71) Applicant: FieldSync Mobile Solutions, LLC, Meridian, ID (US)

(72) Inventors: Ryan J. Thompson, Meridian, ID (US); Justin Grant, Seattle, WA (US)

(73) Assignee: Kordata, LLC, Boise, ID (US)

(*) Notice: Subject to any disclaimer, the term of this patent is extended or adjusted under 35 U.S.C. 154(b) by 670 days.

(21) Appl. No.: 14/642,898

(22) Filed: Mar. 10, 2015

(65) Prior Publication Data

US 2016/0266881 A1 Sep. 15, 2016

(51) Int. Cl.
*G06F 8/60* (2018.01)
*G06F 9/445* (2018.01)

(52) U.S. Cl.
CPC .............. *G06F 8/60* (2013.01); *G06F 9/445* (2013.01)

(58) Field of Classification Search
CPC .. G06F 7/78; G06F 8/00–78; G06F 9/44–455; G06F 11/36; G06F 8/60; G06F 8/61; G06F 9/44505
See application file for complete search history.

(56) References Cited

U.S. PATENT DOCUMENTS

| | | |
|---|---|---|
| 6,286,134 B1 | 9/2001 | Click, Jr. et al. |
| 6,862,735 B1 | 3/2005 | Slaughter et al. |
| 9,015,660 B1* | 4/2015 | Webb ............... G06F 3/048 709/224 |
| 2006/0195460 A1* | 8/2006 | Nori ............... G06F 17/3056 |
| 2007/0130205 A1* | 6/2007 | Dengler ............ G06F 9/4443 |
| 2007/0209034 A1* | 9/2007 | Doganata ............. G06F 9/505 717/174 |
| 2007/0250828 A1* | 10/2007 | Tseitlin ............... G06F 8/36 717/163 |
| 2009/0313004 A1 | 12/2009 | Levi et al. |
| 2010/0077386 A1* | 3/2010 | Akkiraju ............... G06F 8/35 717/136 |
| 2011/0197197 A1* | 8/2011 | Ni ............... G06F 9/547 718/104 |
| 2012/0047425 A1* | 2/2012 | Ahmed ......... G06F 17/30905 715/234 |
| 2012/0290940 A1* | 11/2012 | Quine ............... G06F 16/212 715/744 |
| 2014/0053147 A1 | 2/2014 | Wang |
| 2014/0279838 A1* | 9/2014 | Tsirogiannis ..... G06F 16/211 707/603 |

* cited by examiner

*Primary Examiner* — Charles E Anya
(74) *Attorney, Agent, or Firm* — Hawley Troxell Ennis & Hawley LLP; Philip McKay

(57) ABSTRACT

A computing system environment executes platform-independent instructions to combine object data of a plurality of objects into a platform-independent object. Such objects of the plurality of objects may, for example, include form, entity and schema objects. Platform-dependent instructions comprising a set of one or more platform-specific instructions to display and operate on the platform-independent object are executed on a specific platform type associated with the platform-dependent instructions. By decoupling the hardcoded functionality from easily created and edited object portions of the application design, rapid deployment and execution of customized functionality across multiple distinct platforms is thereby enabled.

33 Claims, 8 Drawing Sheets

METHOD AND SYSTEM FOR RAPID DEPLOYMENT AND EXECUTION OF CUSTOMIZED FUNCTIONALITY ACROSS MULTIPLE DISTINCT PLATFORMS

BACKGROUND

In the computing field, application programs exist to perform many different types of computing tasks, such as financial tasks, mathematical tasks, research tasks, commerce related tasks, and more.

Application programs range from very simple standalone application programs performing one or more simple tasks to very complex systems of programs having rich functionality sets. Often, application programs comprise many software components, each of the software components interoperating to produce a desired result.

Typically, development and deployment of application program and system modules or components takes a great deal of time to get right. An application program or system developer will design the operational features and how those features interoperate, develop source code in one or more languages to implement the designed functionality, compile and link the source code into executable code and then begin a long and sometimes arduous testing process. If one or more software components fail to operate perfectly, the application program or system developer will typically review the source code and the design to locate and correct any errors, thereby ensuring that appropriate processes have been implemented to minimize or eliminate the possibility of further errors occurring once deployment of the application program or system has taken place.

In more complex situations where different system modules or components reside on different platforms, each of the processes listed above often needs to take place independently for each software module or component and for each platform those modules or components are deployed on.

Further, the processes listed above are required to be undertaken each time any of the modules or components require updating, such as when a module or component lacks additional desired functionality. Thus, when adding a function to an already deployed application program or system, an application program or system developer will review the earlier design of the already-deployed operational features and how those features interoperate, and then will add to the original design or alternatively change the original design, or both, in order to accommodate the new functionality. The application program or system developer then develops new source code in one or more languages to implement the designed functionality, while not affecting the already deployed functionality, and then compiles and links the source code into executable code. The resulting executable code is a new version of the application program or system which is then subjected to the long and sometimes arduous testing process.

Again, if one or more new software components fail to operate perfectly, the application program or system developer will review the new source code and the new design to locate and correct any errors, to minimize or eliminate the possibility of further errors occurring once deployment of the application program or system has taken place.

The processes discussed above typically result in an application program or system generalized to satisfy the overall needs of a diverse user base. However, there is little customizability for each different set of authorized users. To customize an application program or a system for different sets of users, application program or system developers typically have to create a new set of software modules or component s for each new set of users. Each new set of software modules or component s then has to be independently maintained and updated, requiring a great deal of additional manpower. Maintaining multiple different sets of software modules or components tremendously increases the manpower and resource burden associated with creation and upkeep of the source code.

Thus, what is needed is a new method and system for rapid deployment and execution of customized functionality across multiple distinct platforms.

SUMMARY

A computing system environment executes platform-independent instructions to combine object data of two or more objects into a platform independent object, such as combining two or more of form object data of one or more form objects, schema object data of one or more schema objects and entity object data of one or more entities, into a platform-independent object. Platform-dependent instructions comprising a set of one or more platform-specific instructions to operate on the platform-independent object are deployed to and then executed on a platform having a specific platform type associated with the platform-dependent instructions. The platform-dependent instructions convert the platform-independent object into one or more platform-dependent object employing functionality described by the plurality of objects, and displays the one or more platform-dependent objects on the platform. By decoupling the hardcoded functionality from portions of the application design, rapid deployment and execution of customized functionality across multiple distinct platforms is thereby enabled.

In one embodiment, a system for rapid deployment and execution of customized functionality across multiple distinct platforms includes a database coupled to a network, the database having object data of a plurality of objects, wherein, in one embodiment, the plurality of objects includes one or more entity objects, and/or one or more schema objects, and/or one or more form objects.

In one embodiment, each entity object includes specific data describing a distinct entity object. Each schema object defines a type of entity object and what each type of entity object is allowed to contain. Form objects each define a form including one or more fields. Fields may be of different types, with each field having a wide variability and flexibility as to function and purpose.

In one embodiment, the system for rapid deployment and execution of customized functionality across multiple distinct platforms further includes a set of platform-independent instructions comprising instructions to combine object data of a plurality of objects, such as form object data of one or more form objects, schema object data of one or more schema objects and entity object data of one or more entities, into a platform-independent object.

In one embodiment, the system for rapid deployment and execution of customized functionality across multiple distinct platforms further includes a set of platform-dependent instructions comprising a set of one or more platform-specific instructions to operate on the platform-independent object to create a platform-dependent object which is then displayed using a specific platform type associated with the platform-dependent instructions.

In one embodiment, the system for rapid deployment and execution of customized functionality across multiple distinct platforms further includes a computing processor, the computing processor configured to communicate with the database over the network and a memory coupled to the computing processor, the memory including computing processor executable instructions to perform a process for rapid deployment and execution of customized functionality across multiple distinct platforms.

In one embodiment, the process for rapid deployment and execution of customized functionality across multiple distinct platforms includes combining, using at least a portion of the set of platform-independent instructions, object data of a plurality of objects, such as object information of at least one schema object, object information of at least one entity object, and object information of at least one form object, into a platform-independent object.

In one embodiment, the process for rapid deployment and execution of customized functionality across multiple distinct platforms further includes deploying the platform-specific set of instructions to a first platform of the specific platform type of the set of platform-specific instructions;

In one embodiment, the process for rapid deployment and execution of customized functionality across multiple distinct platforms further includes converting, by performing at least a portion of the set of platform-dependent instructions by the first platform, at least a portion of the platform-independent object into a platform-dependent object and displaying at least a portion of the platform-dependent object by the first platform.

In one embodiment, the process for rapid deployment and execution of customized functionality across multiple distinct platforms further includes receiving user input from a user of the first platform changing the platform-dependent object by changing already existing data or adding new data that was not previously associated with the platform-dependent object and integrating, by performing at least a portion of the set of platform-dependent instructions by the first platform, at least a portion of the changed platform-dependent object into the platform-independent object.

In one embodiment, the process for rapid deployment and execution of customized functionality across multiple distinct platforms further includes transferring at least one or more changed or new portions of the platform-independent object to one or more entity objects associated with the changed or added user input.

In one embodiment, transferring at least one or more changed or new portions of the platform-independent object to one or more entity objects associated with the changed or added user input includes determining one or more schema objects associated with one or more entity objects associated with the changed or new portions of the platform-independent object, transferring, for each property of the schema associated with the changed or new portions of the platform-independent object, the changed or new portions of the platform-independent object into the associated entity object, and storing the changed or new portions of the associated entity object in a database or other storage location.

In one embodiment, form objects include a pathname, where a pathname includes a schema designator or identifier, the schema designator being data identifying a specific schema object.

In one embodiment, one or more property objects further includes property object or characteristic data including one or more of a property object title and a property object type.

In one embodiment, one or more schema objects further include one or more default properties and/or one or more required properties and one or more form objects includes a property object having property object data directly corresponding to and overriding one or more of the associated default and/or required properties.

In one embodiment, the platform-independent instructions are executed on a first platform and the platform-dependent instructions are executed on a second platform.

In one embodiment, the platform-independent instructions and the platform-dependent instructions are both executed on the same platform.

In one embodiment, the process for rapid deployment and execution of customized functionality across multiple distinct platforms further includes receiving user input including login data, validating the login data as being of an authorized user, retrieving authorized user data of the user from the database, the authorized user data including a plurality of predetermined objects associated with the authorized user data, such as a predetermined form object and a predetermined entity object. In one embodiment, the object information of at least one entity object includes object information from the predetermined entity object and the object information of at least one form object includes object information from the predetermined form object.

By decoupling the functionality of the platform-independent instructions and platform-dependent instructions from other portions of the application design, rapid deployment and execution of customized functionality across multiple distinct platforms is thereby enabled. Significant time savings is achieved as a result. Further, schema, form and entity objects may be designed and created by nontechnical persons, thus freeing up the technical persons for higher level complex tasks.

Therefore, implementations of embodiments of the present disclosure represent a significant improvement to the field of user experience and, in particular, efficient use of human and non-human resources.

Figure 1:
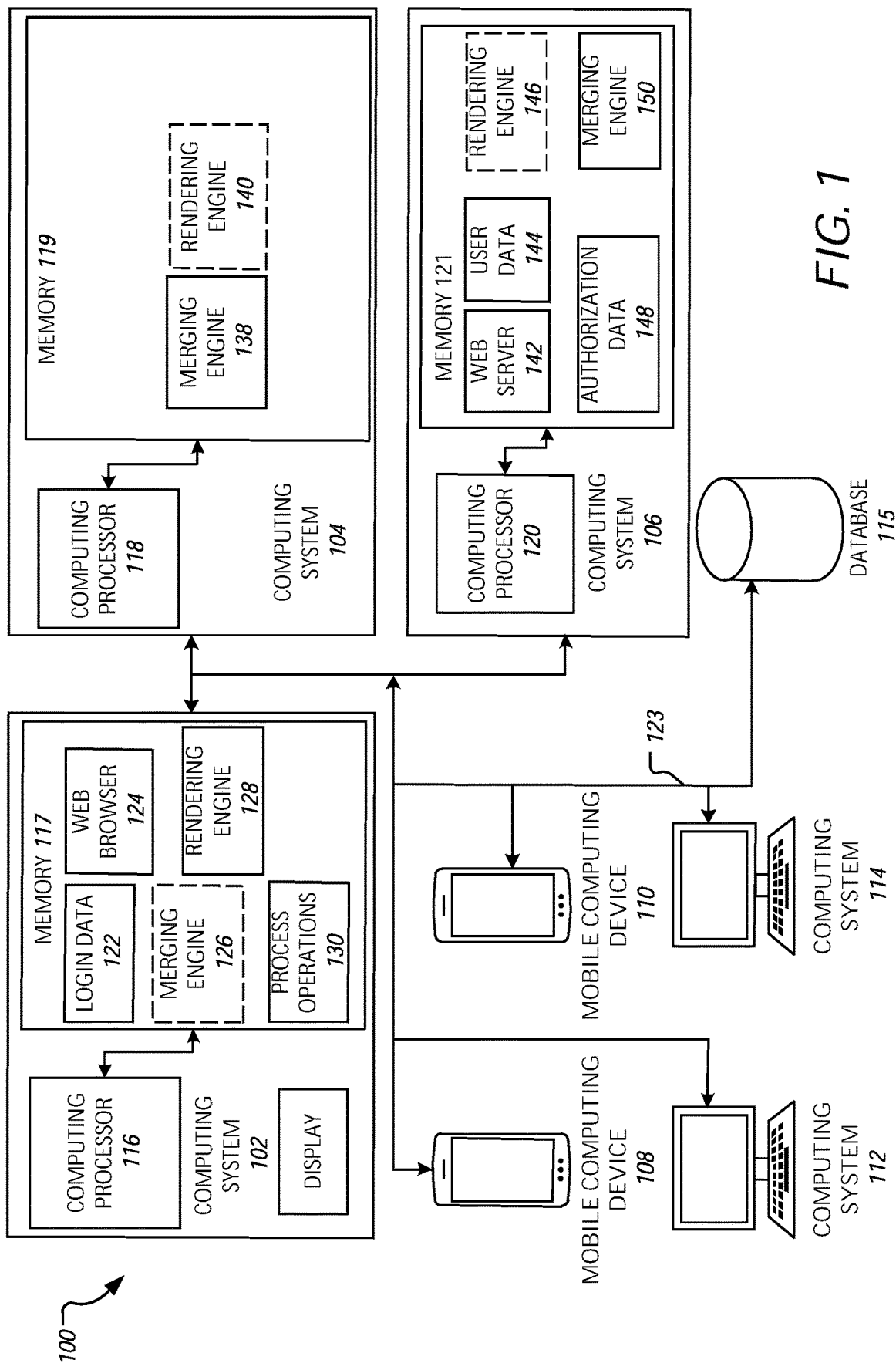
FIG. 1 is a block diagram of a system for rapid deployment and execution of customized functionality across multiple distinct platforms in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

FIG. 1 is a block diagram of a system for rapid deployment and execution of customized functionality across multiple distinct platforms in accordance with one embodiment.

Referring to FIG. 1, system 100 includes, in one embodiment, one or more of computing system 102, computing system 104, computing system 106, mobile computing device 108, mobile computing device 110, computing system 112, computing system 114, and database 115, all communicating through one or more communication channels or networks such as network 123.

In one embodiment, the computing systems and mobile computing devices discussed herein, such as computing system 102, computing system 104, computing system 106, mobile computing device 108, mobile computing device 110, computing system 112 and computing system 114 each include one or more computing processors and associated memory to which the one or more computing processors are coupled. For example, computing system 102, computing system 104, and computing system 106 include respective computing processors 116, 118 and 120, and respective memories 117, 119, and 121.

Although each computing system depicted herein appears to include a single computing processor and memory combination, persons of ordinary skill having the benefit of this disclosure will readily appreciate that each computing system and/or each mobile computing device discussed herein may either share a computing processor and/or memory with one or more other computing systems or mobile computing device, or may employ more than one computing processor and/or more than one memory. Further, persons of ordinary skill having the benefit of this disclosure will further readily appreciate that the various computing systems employing portions of embodiments discussed herein may be constructed differently than other computing systems employing other portions of embodiments discussed herein. Additionally, the number of memories and the number of computing processors need not be the same.

Mobile computing devices discussed herein may be configured similarly to any of the computing systems discussed herein.

As used herein, the terms "computing system," "computing device," and "computing entity," include, but are not limited to: a computing environment, a virtual asset, a server computing system, a workstation, a desktop computing system, a mobile computing system, including, but not limited to, smart phones, portable devices, and/or devices worn or carried by a user, a database system or storage cluster, a switching system, a router, any hardware system, any communications system, any form of proxy system, a gateway system, a firewall system, a load balancing system, or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone, a cellular phone, a digital wireless telephone, a tablet computing system, a notebook computing system, any portable computing system, a two-way pager, a Personal Digital Assistant (PDA), a media player, an Internet appliance, devices worn or carried by a user, or any other movable/mobile device and/or computing system that includes components that can execute all, or part, of any one of the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, cloud computing environments, and networking/communications systems.

In various embodiments, each computing environment includes allocated assets and virtual assets associated with, and controlled or used to create, and/or deploy, and/or operate platform-dependent and/or platform-independent instruction sets as discussed herein.

In various embodiments, one or more cloud computing environments are used to implement portions or all of the embodiments described herein, including any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In one embodiment, two or more assets, such as computing systems and/or virtual assets, and/or two or more computing environments are connected by one or more communications channels or network components including, but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

In one embodiment, computing system 102 and one or more of mobile computing device 108, mobile computing device 110, computing system 112 and computing system 114 include a display, such as display 134, for displaying or otherwise presenting data to a user of the respective computing system or mobile computing device.

In one embodiment, memory 117 of computing system 102 includes one or more of login data 122, web browser 124, merging engine 126, rendering engine 128 and process operations 130.

Login data 122 and web browser 124, if present on computing system 102 is used, in one embodiment, to enable automatic login processes discussed below.

Merging engine 126 includes a set of platform-independent computing processor executable instructions provided to combine object information of a plurality of objects, such as one or more of object information of at least one schema object, object information of at least one entity object, and object information of at least one form object into a platform-independent object.

Rendering engine 128 includes a set of computing processor executable instructions provided to operate on the platform-independent object, and optionally includes platform-specific instructions to interact with native platform functionality to create a display for a user and present that display to the user.

In a system where computing system 102 is an end-user computing system, memory 119 of computing system 104 includes, in one embodiment, at least a portion of merging engine 138 and optionally includes at least a portion of rendering engine 140. In this embodiment, computing system 104 is provided to execute the platform-independent computing processor instructions of merging engine 138 and provides the resulting platform-independent object to rendering engine 128 of computing system 102.

In one embodiment, memory 121 of computing system 106 includes one or more of web server 142, user data 144, at least a portion of rendering engine 146, authorization data 148 and at least a portion of merging engine 150. In this disclosure, any set of platform-independent instructions may be included in any merging engine, and any set of platform-dependent instructions may be included in any rendering engine.

In one embodiment, a network accessible computing system such as computing system 106 operates as a server, and creates the output of a merging engine such as merging engine 150 or merging engine 138, passing that output through a web browser or other application program to a set of platform-dependent instructions such as rendering engine 128, for presentation to a user.

In practical application, a user of computing system 102 provides login data, such as login data 122, through a web browser, such as web browser 124, to a computing system, such as computing system 106, which receives the login data through web server 142. Validation of the user of computing system 102 includes comparing at least a portion of login data 122 with at least a portion of authorization data 148 to determine whether the compared portions of login data 122 and authentication data 148 match. If so, the user of computing system 102 is validated as an authorized user of web server 142. Following a successful validation of at least a portion of the login data, web server 142 interacts with merging engine 150 which comprises a set of platform-independent instructions which use data from database 115 to create a platform-independent object which is then sent back through web server 142 and web browser 124 to computing system 102. Rendering engine 128 of computing system 102 comprises a set of platform-dependent instructions which operate on the received platform-independent object to create a platform dependent object which is then displayed for the user of computing system 102 on display 134.

Database 115 includes, in one embodiment, one or more of a set of platform-dependent instructions, a set of platform-independent instructions, and object information of a plurality of objects, such as one or more of object information of one or more schema objects, object information of one or more entity objects, and object information of one or more form objects, and authorization data such as authorization data 148.

In one embodiment, reference to platform-dependent instructions is intended to refer to instructions which are required to be performed either by processes of a specific computing system or natively by a computing processor of a computing system or mobile computing device, for example, in order to create a device-specific display. Platform-dependent instructions are executed, in one embodiment, when creating and displaying a platform-independent object on a display device of mobile computing device 108, for example. Platform-dependent instructions, in one embodiment interact with a state machine, or alternatively may include process operations of a state machine.

In one embodiment, reference to platform-independent instructions is intended to refer to instructions which may be performed by any traditional computing processor of a computing system or mobile computing device, for example, in order to create a platform-independent result. Platform-independent instructions are executed, in one embodiment, when combining object information of a plurality of objects, such as one or more of object information of at least one schema object, object information of at least one entity object, and object information of at least one form object, into a platform-independent object.

Figure 2:
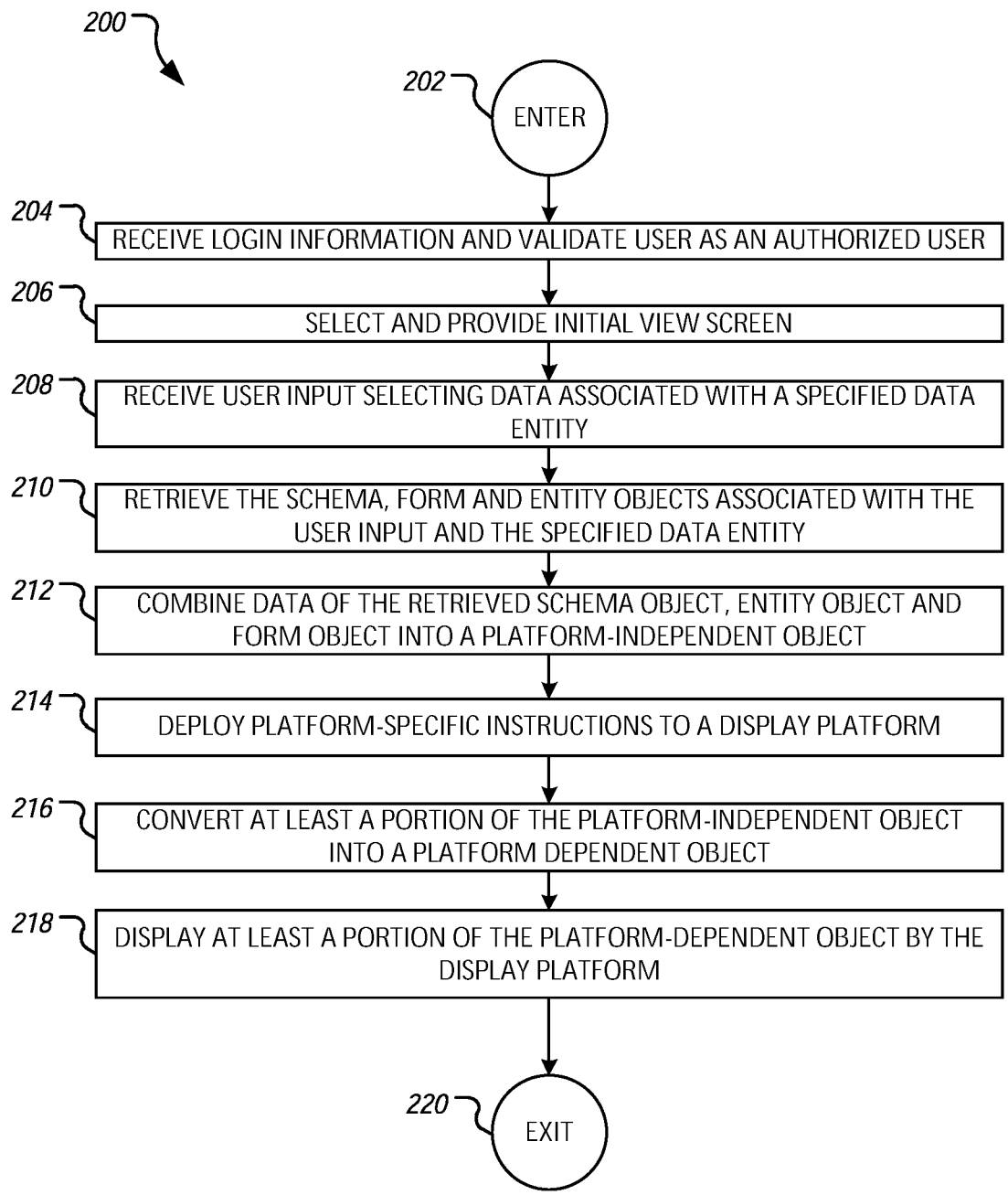
FIG. 2 is a flow chart representing one example of a process for rapid deployment and execution of customized functionality across multiple distinct platforms in accordance with one embodiment.

FIG. 2 is a flow chart representing one example of a process for rapid deployment and execution of customized functionality across multiple distinct platforms in accordance with one embodiment.

In one embodiment, process 200 for rapid deployment and execution of customized functionality across multiple distinct platforms begins with ENTER OPERATION 202 and proceeds with RECEIVE LOGIN INFORMATION AND VALIDATE USER AS AN AUTHORIZED USER OPERATION 204.

In one embodiment, at RECEIVE LOGIN INFORMATION AND VALIDATE USER AS AN AUTHORIZED USER OPERATION 204, a user of a computing system, such as computing system 102, submits login data, such as a username and password, through a user interface provided by process operations 130. Alternatively, In one embodiment, at RECEIVE LOGIN INFORMATION AND VALIDATE USER AS AN AUTHORIZED USER OPERATION 204, login data, such as login data 122, is stored on the computing system of the user, such as computing system 102 or mobile computing device 108, and is used for automatic login purposes so that the user does not have to personally supply the login data, such as login data 122, each time.

In one embodiment, at RECEIVE LOGIN INFORMATION AND VALIDATE USER AS AN AUTHORIZED USER OPERATION 204, following receipt of the login data, such as login data 122, at the computing system, such as computing system 102, at least a portion of the login data is compared with at least a portion of the authorization data, such as authorization data 148, located at either database 115 or another computing system, such as computing system 106, in order to determine whether the portion of login data matches the portion of authorization data and thus whether a user of computing system 102, for example, is an authorized user. Alternatively, at least a portion of the received login data may be compared with at least a portion of encrypted or plaintext authorization data stored on the computing system the user is using, such as computing system 102 or mobile computing device 108, for example, in order to determine whether the compared login data matches the compared authorization data and thus validate the user as an authorized user.

Once a determination has been made that at least a portion of the login data provided at the computing system, such as computing system 102 or mobile computing device 108, matches at least a portion of the authorization data, such as authorization data 148, process operations 130, present on the computing system the user is using, treat the user of the now validated computing system as being an authorized user.

In one embodiment, validation of the user of a given computing system, such as computing system 102 or mobile computing device 108, triggers a determination of profile data, based on the provided login data.

In one embodiment, the profile data associated with the login data includes startup data indicating a particular desired combination of objects of the plurality of objects available in database 115, for example, such as particular schema, entity and/or form objects to use to generate a platform-independent object and then processed by platform-dependent instructions to generate and provide an initial display for the user.

In one embodiment, following the determination of profile data associated with the login data used to validate the computing system, such as computing system 102 or mobile computing device 108, as an authorized computing system or alternatively to validate a user of the computing system as an authorized user, process flow proceeds with SELECT AND PROVIDE INITIAL VIEW SCREEN OPERATION 206.

In one embodiment, at SELECT AND PROVIDE INITIAL VIEW SCREEN OPERATION 206, the profile data is used to generate an initial view screen or display for the user.

In one embodiment, at SELECT AND PROVIDE INITIAL VIEW SCREEN OPERATION 206, an initial view screen includes a display of a blank form, i.e. a form object that is not populated with entity data from any entity object.

In one embodiment, at SELECT AND PROVIDE INITIAL VIEW SCREEN OPERATION 206, an initial display for the user includes a display of a populated form, i.e. a form object populated with entity data of one or more entity objects.

A user interface having one or more forms, in one embodiment, is a user interface resulting from the display of object information of one or more form objects of the system, such as one or more form objects that may be stored in database 115 and retrieved by a computing system, such as computing system 102 or mobile computing device 108.

In one embodiment, at SELECT AND PROVIDE INITIAL VIEW SCREEN OPERATION 206, where an initial display for the user includes a display of a populated object, such as a populated form object, the populated form object is created using processes described herein. Given the user profile information which includes a form designation and an entity designation, for example, the proper schema, entity and form objects are retrieved from a data source, such as from database 115. Data from the schema, entity and form objects is then combined into a platform-independent object which is then displayed through platform-dependent instructions on the computing device the display is being presented on. Further details on the combining operations in accordance with one embodiment will be presented below.

In one embodiment, following the development and presentation of an initial view screen at SELECT AND PROVIDE INITIAL VIEW SCREEN OPERATION 206, process flow proceeds with RECEIVE USER INPUT SELECTING INFORMATION ASSOCIATED WITH A SPECIFIED DATA ENTITY OPERATION 208.

In one embodiment, at RECEIVE USER INPUT SELECTING DATA ASSOCIATED WITH A SPECIFIED DATA ENTITY OPERATION 208, user input is received which triggers the retrieving of object information pertaining to one or more particular objects, such as an entity object other than an entity object associated with the initial view screen provided at SELECT AND PROVIDE INITIAL VIEW SCREEN OPERATION 206.

In an exemplary embodiment, the initial view screen provided at SELECT AND PROVIDE INITIAL VIEW SCREEN OPERATION 206 includes a form element comprising, for example, a drop-down box listing multiple possible operations, such as "view last time entry", "add new time entry", and "edit last time entry." In one embodiment, using the drop-down box example, at RECEIVE USER INPUT SELECTING DATA ASSOCIATED WITH A SPECIFIED DATA ENTITY OPERATION 208, user input is received selecting "edit last time entry."

In one embodiment, following receipt of the user input selecting data associated with a specific data entity object, at RECEIVE USER INPUT SELECTING DATA ASSOCIATED WITH A SPECIFIED DATA ENTITY OPERATION 208, process flow proceeds with RETRIEVE THE SCHEMA, FORM AND ENTITY OBJECTS ASSOCIATED WITH THE USER INPUT AND THE SPECIFIED DATA ENTITY OPERATION 210.

In one embodiment, at RETRIEVE THE SCHEMA, FORM AND ENTITY OBJECTS ASSOCIATED WITH THE USER INPUT AND THE SPECIFIED DATA ENTITY OPERATION 210, the user input is examined with initial view screen data associated with the view screen, such as the view screen previously discussed at SELECT AND PROVIDE INITIAL VIEW SCREEN OPERATION 206, in order to determine and retrieve one or more objects of the plurality of objects, such as schema, form, and entity objects associated with the received user input. In one embodiment, the received user input changes at least one value associated with at least one form field of the initial view screen. In one embodiment, the received user input is considered together with data already presented by the initial view screen when considering which objects of the plurality of objects, such as schema, form and entity objects to retrieve at RETRIEVE THE SCHEMA, FORM AND ENTITY OBJECTS ASSOCIATED WITH THE USER INPUT AND THE SPECIFIED DATA ENTITY OPERATION 210.

In one embodiment, at RETRIEVE THE SCHEMA, FORM AND ENTITY OBJECTS ASSOCIATED WITH THE USER INPUT AND THE SPECIFIED DATA ENTITY OPERATION 210, one or more objects of the plurality of objects, such as schema, form, and/or entity objects associated with the received user input are retrieved from a memory or data source, such as the memory or disk drive of a networked computing system, a database such as database 115, or from any other data source known to persons of ordinary skill or later developed.

Continuing with the earlier example where, at RECEIVE USER INPUT SELECTING DATA ASSOCIATED WITH A SPECIFIED DATA ENTITY OPERATION 208 user input was received selecting "edit last time entry," a determination of an entity object representing the user's last time entry is made, such as by reviewing a user entity object representing the user, and the objects of the plurality of objects, such as schema, form, and entity object associated with the last time entry are retrieved.

In one embodiment, following the retrieval of objects of the plurality of objects, such as schema, entity and form objects at RETRIEVE THE SCHEMA, FORM AND ENTITY OBJECTS ASSOCIATED WITH THE USER INPUT AND THE SPECIFIED DATA ENTITY OPERATION 210, process flow proceeds with COMBINE DATA OF THE RETRIEVED SCHEMA OBJECT, ENTITY OBJECT AND FORM OBJECT INTO A PLATFORM-INDEPENDENT OBJECT OPERATION 212.

In one embodiment, functionality of merging engine 126 or merging engine 138, or merging engine 150 is used at COMBINE DATA OF THE RETRIEVED SCHEMA OBJECT, ENTITY OBJECT AND FORM OBJECT INTO A PLATFORM-INDEPENDENT OBJECT OPERATION 212 to combine at least portions of the retrieved objects of the plurality of objects, such as schema, entity and form objects into a platform-independent object.

In various embodiments, the functionality of merging engines 126, 138 and 150 may be performed by any one or more computing processors of any computing system or mobile computing device, such as computing systems 104 and 106, and mobile computing devices 108 and 110. Portions of the functionality may also be spread among several computing systems and mobile computing devices as desired.

At any time prior to converting at least a portion of the platform-independent object at CONVERT AT LEAST A PORTION OF THE PLATFORM-INDEPENDENT OBJECT INTO A PLATFORM-DEPENDENT OBJECT OPERATION 216, platform-specific instructions are deployed as needed, at DEPLOY PLATFORM-SPECIFIC INSTRUCTIONS TO A DISPLAY PLATFORM OPERATION 214, to the computing system from which user input was received at RECEIVE USER INPUT SELECTING DATA ASSOCIATED WITH A SPECIFIED DATA ENTITY OPERATION 208, such as at computing system 102.

For example, in one embodiment, if the login data of RECEIVE LOGIN INFORMATION AND VALIDATE USER AS AN AUTHORIZED USER OPERATION 204 is received from a user of mobile computing device 108, then it is most likely the case that the user input of RECEIVE USER INPUT SELECTING DATA ASSOCIATED WITH A SPECIFIED DATA ENTITY OPERATION 208 was first received at mobile computing device 108, but it is not necessarily true that COMBINE DATA OF THE RETRIEVED SCHEMA OBJECT, ENTITY OBJECT AND FORM OBJECT INTO A PLATFORM-INDEPENDENT OBJECT OPERATION 212 will be performed at the same computing system or mobile computing device, such as mobile computing device 108.

Instead, COMBINE DATA OF THE RETRIEVED SCHEMA OBJECT, ENTITY OBJECT AND FORM OBJECT INTO A PLATFORM-INDEPENDENT OBJECT OPERATION 212 is, in one embodiment, a platform-independent task, and may be performed on any computing system or mobile computing device, such as computing system 104, computing system 106, computing system 114, or any other available computing system or mobile computing device.

For high overhead systems, load balancing processes known to those of ordinary skill may be employed as needed to redirect merging engine operations such as COMBINE DATA OF THE RETRIEVED SCHEMA OBJECT, ENTITY OBJECT AND FORM OBJECT INTO A PLATFORM-INDEPENDENT OBJECT OPERATION 212 to merging engines having greater available bandwidth.

Returning to CONVERT AT LEAST A PORTION OF THE PLATFORM-INDEPENDENT OBJECT INTO A PLATFORM-DEPENDENT OBJECT OPERATION 216, at least a portion of the platform-independent object is converted into displayable form, and mappings or links are created between display elements in the platform-dependent object and the platform-independent object, using a form view model selected to correspond to a particular form view being employed in the display.

Figure 3:
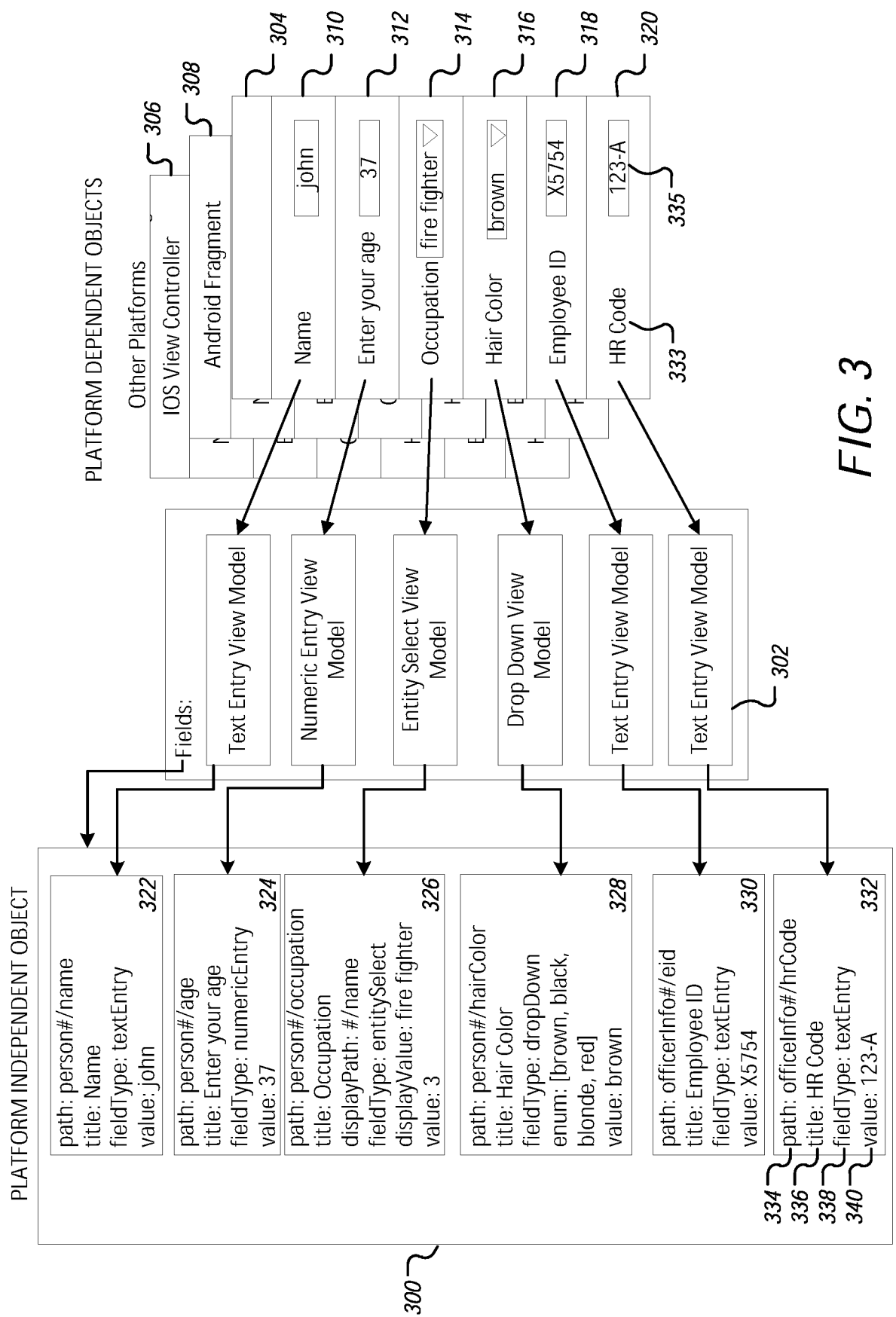
FIGS. 3 and 4 are exemplary representations of mappings and processes between a platform-dependent object and a platform-independent object.
Figure 4:
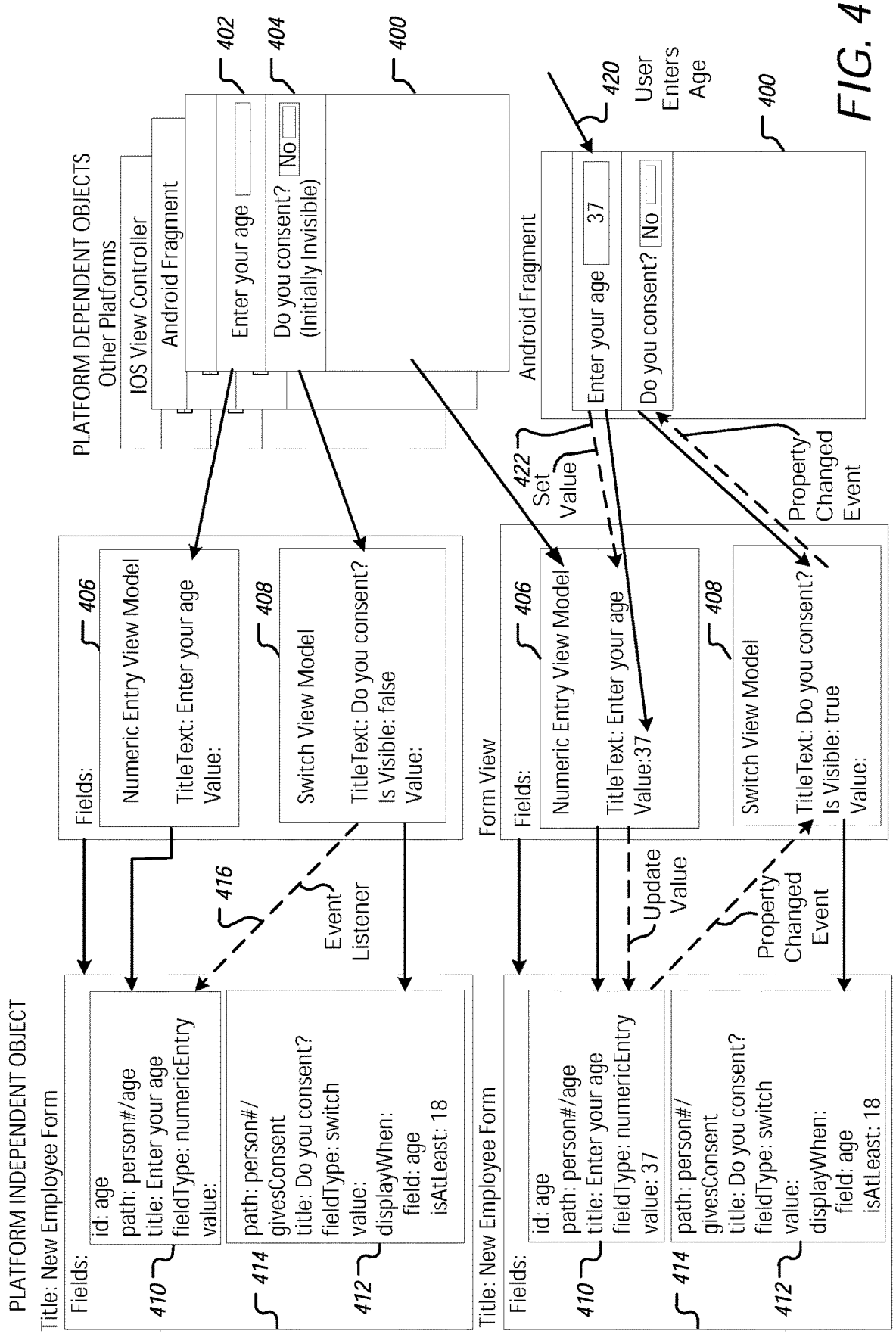

FIGS. 3 and 4 are exemplary representations of mappings and processes between a platform-dependent object and a platform-independent object.

Referring to FIG. 2 and FIG. 3 together, platform-independent object 300 has data divided into groups, based on a particular form element, an associated schema, and data values.

Platform-dependent objects 304, 306 and 308 represent examples of different platform-dependent objects that represent at least portions of the same platform-independent object. Thus, in one embodiment, if the platform where the platform-dependent object to be displayed employs a first operating system, such as the Android Operating system, then platform-dependent object 304 would be generated at CONVERT AT LEAST A PORTION OF THE PLATFORM-INDEPENDENT OBJECT INTO A PLATFORM-DEPENDENT OBJECT OPERATION 216, and the other platform-dependent objects 306 and 308 are not needed and are thus not generated.

Alternatively, if the platform where the platform-dependent object to be displayed employs a second operating system, such as the IOS Operating system, then platform-dependent object 308 would be generated at CONVERT AT LEAST A PORTION OF THE PLATFORM-INDEPENDENT OBJECT INTO A PLATFORM-DEPENDENT OBJECT OPERATION 216, and the other platform-dependent objects 304 and 306 are not needed and are thus not generated.

In one embodiment, platform-specific instructions deployed to a given platform at DEPLOY PLATFORM-SPECIFIC INSTRUCTIONS TO A DISPLAY PLATFORM OPERATION 214 include instructions for multiple platforms, but only those platform-specific instructions designated for the display platform are actually executed by the computing processor.

In one embodiment, platform-specific instructions deployed to a given platform at DEPLOY PLATFORM-SPECIFIC INSTRUCTIONS TO A DISPLAY PLATFORM OPERATION 214 ONLY include instructions specific to the display platform platforms, and thus do not include any platform-specific instructions for a different platform.

Platform-dependent object 304 is shown having multiple form fields, such as form fields 310, 312, 314, 316, 318, and 320. Each of the form fields are mapped through a form view model, such as form view model 302, as one example, specific to the field type associated with the particular field to a group of properties and data, such as properties 322, 324, 326, 328, 330, and 332, associated with the platform-independent object produced at COMBINE DATA OF THE RETRIEVED SCHEMA OBJECT, ENTITY OBJECT AND FORM OBJECT INTO A PLATFORM-INDEPENDENT OBJECT OPERATION 212.

Using form field 320 and property object 332 as an example, form field 320 has a title 333 associated with it which is represented in platform-independent object 300 with a "title" tag as attribute 336. Correspondingly, form field 320 further has a value 335 associated with it which is represented in platform-independent object 300 with a "value" tag as attribute 340. Further, form field 320 is a "textentry" fieldtype, as seen in attribute 338 of platform-independent object 300. Finally, each form field is associated with a pathname pointing to a particular schema, with form field 320 depicted herein as being associated with the "hrcode" section of the "officeinfo" schema.

As is also evident in FIG. 3, numerous field types are possible, including, for example, a drop down field type which lets the user select a single option out of many options, an entity select field type which lets the user select a single entity object out of many options, a currency field type which is a number field which allows decimals and displays different currency types as needed, a text area field type that allows a multiple line text input and where a number of lines to display on a platform for the user may be specified by a variable associated with the schema, or overridden in the form, a barcode field type that uses an optical device associated with the platform to capture data from a Quick Response (QR) code or barcode and maps that captured data to a string property, a date field type, a date picker field type, a time picker field type, a multi-select field type that lets the user select multiple options out of many options, a number field type, a switch field type employing a switch with a label where the switch can be in the 'on' or 'off' state, a date field type, a geolocation field type that lets the user collect the current location, a text input field type, a stepper field type which allows the user to input a number by engaging on + or − buttons to increment or decrement the value, a signature field type which allows the user to draw a signature on a display pop up, a picture field type that allows the user to either take a picture or select one from the gallery and which also has another optional property "source:camera" or "source:gallery" where if a source is not specified, the default one is the camera, a text display field type a checkbox field type, a yes/no field type, and a bullet button field type. Each field type corresponds to a schema type and also optionally corresponds to a format. For example, a text input field type is associated with a schema type "string" and has no particular format associated with it. However, a field type of "timepicker" is associated with a schema type "string" and employs a "time" format to display a time associated with an entity being displayed.

Referring now to FIGS. 2 and 4 together, platform-dependent object 400 having fields 402 and 404 is shown together with respective form view models 406 and 408 and respective property objects 410 and 412.

FIG. 4 is divided into a top state and a bottom state, where the top series of depictions represent a state after platform-independent object 414 has been created and then used to create platform-dependent object 400, prior to any data entry through the receipt of data from a user of platform-dependent object 400. The bottom state of FIG. 4 includes operations and triggers that result from a user entering data into platform-dependent object 400.

As a result of the "switch" fieldtype being employed here in property object 412, an event listener 416 has been implemented to track the condition of the switch which is dependent on the value of the field "age". As can be seen, the field represented by property object 412, is not displayed if the value of age is not at least 18, since the condition set in the "displaywhen" property indicates that the field should be displayed if the "age" is at least "18".

Referring now to FIG. 2 and the bottom state of FIG. 4, user input 420 is received at the computing system or mobile computing device of the user, such as computing system 102 (FIG. 1) or mobile computing device 108. Referring again to FIGS. 2 and 4, user input 420 comprises new data reflecting an age, with the new data being "37". In one embodiment, following the receipt of user input 420, a platform dependent set value function 422 updates form view model 406 to include the new value, and further updates property object 410 of platform-independent object 414.

At some time following the update to form view model 406, event listener 416 is triggered, resulting in a change of state for form view model 408. The change of state for form view model 408 causes the "givesconsent" field 404 to become visible. Many other events and event listener combinations are possible.

Returning to the discussion of FIG. 2, at any time following the completion of COMBINE DATA OF THE RETRIEVED SCHEMA OBJECT, ENTITY OBJECT AND FORM OBJECT INTO A PLATFORM-INDEPENDENT OBJECT OPERATION 212 and DEPLOY PLATFORM-SPECIFIC INSTRUCTIONS TO A DISPLAY PLATFORM OPERATION 214, process flow proceeds with DISPLAY AT LEAST A PORTION OF THE PLATFORM-DEPENDENT OBJECT BY THE DISPLAY PLATFORM OPERATION 218.

In one embodiment, following the completion of DISPLAY AT LEAST A PORTION OF THE PLATFORM-DEPENDENT OBJECT BY THE DISPLAY PLATFORM OPERATION 218, process flow proceeds with EXIT OPERATION 220 at which time the process terminates awaiting new input.

Earlier, discussion was presented regarding COMBINE DATA OF THE RETRIEVED SCHEMA OBJECT, ENTITY OBJECT AND FORM OBJECT INTO A PLATFORM-INDEPENDENT OBJECT OPERATION 212. Details as to one embodiment reflecting how COMBINE DATA OF THE RETRIEVED SCHEMA OBJECT, ENTITY OBJECT AND FORM OBJECT INTO A PLATFORM-INDEPENDENT OBJECT OPERATION 212 takes place are presented in the discussion below.

Figure 5:
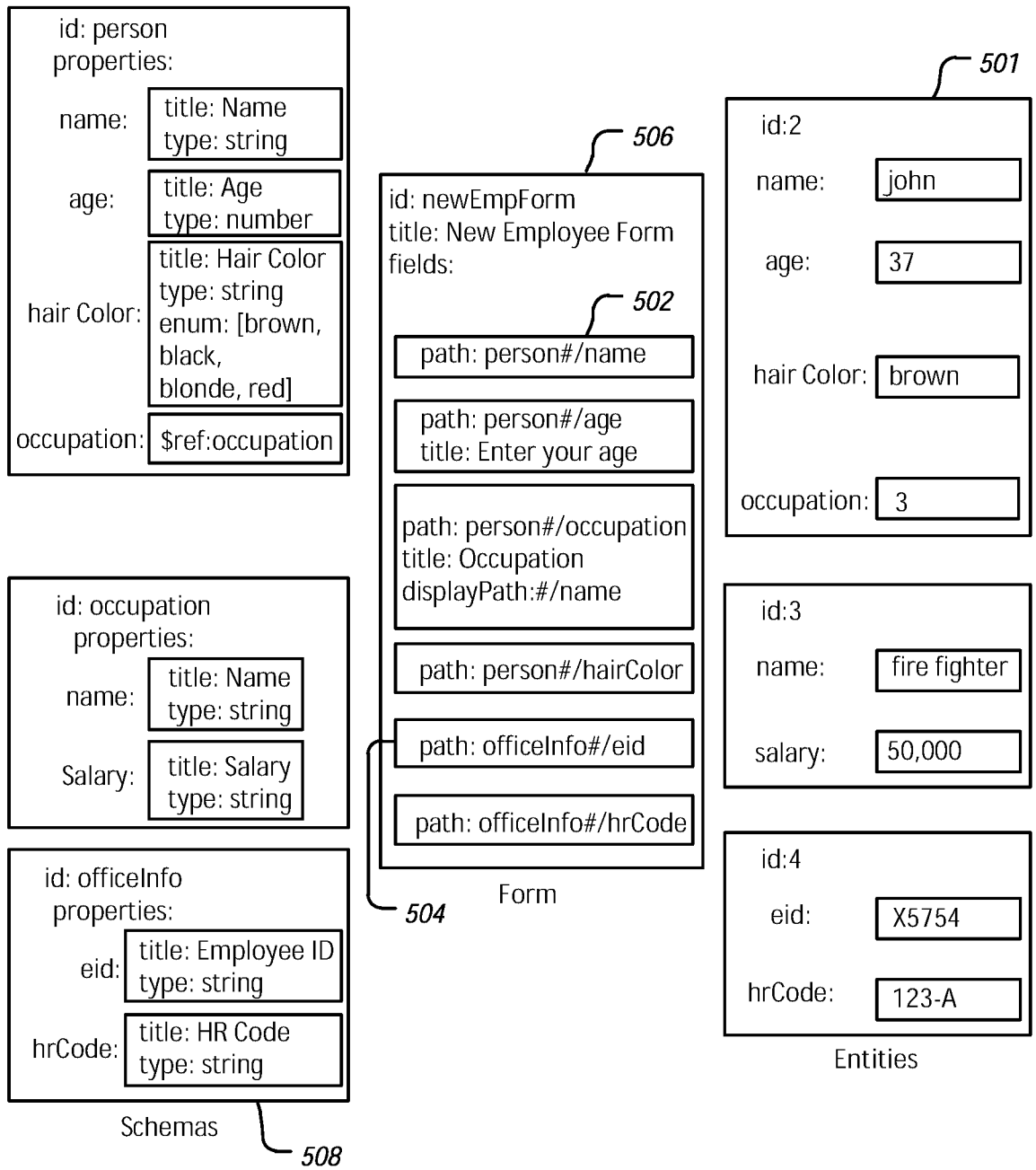
FIG. 5 is a chart showing schema, form and entity objects according to one embodiment.

FIG. 5 is a chart showing schema, form and entity objects according to one embodiment.

Figure 6:
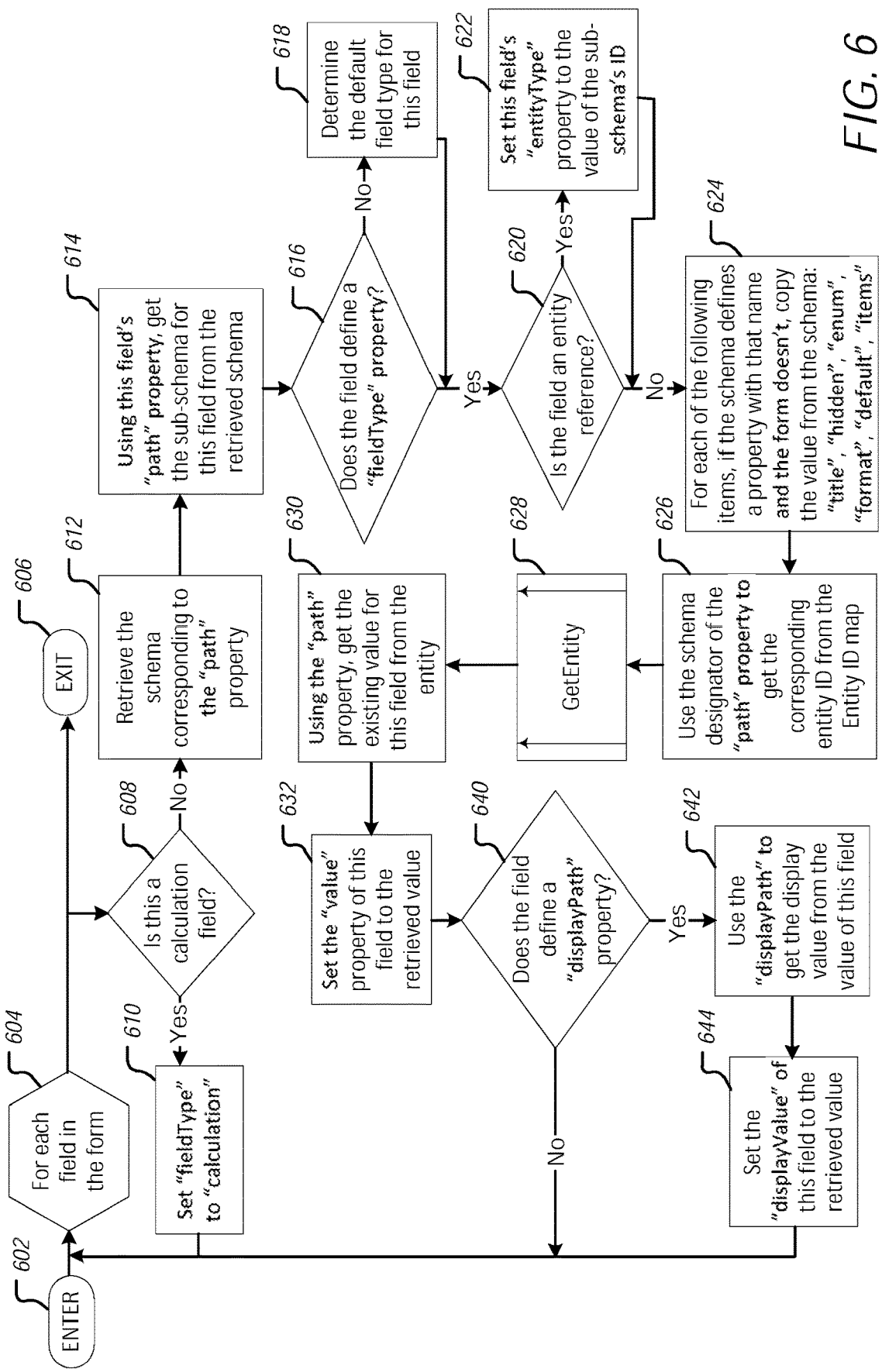
FIGS. 6 through 8 are flow charts representing more details of a process for rapid deployment and execution of customized functionality across multiple distinct platforms in accordance with one embodiment.
Figure 7:
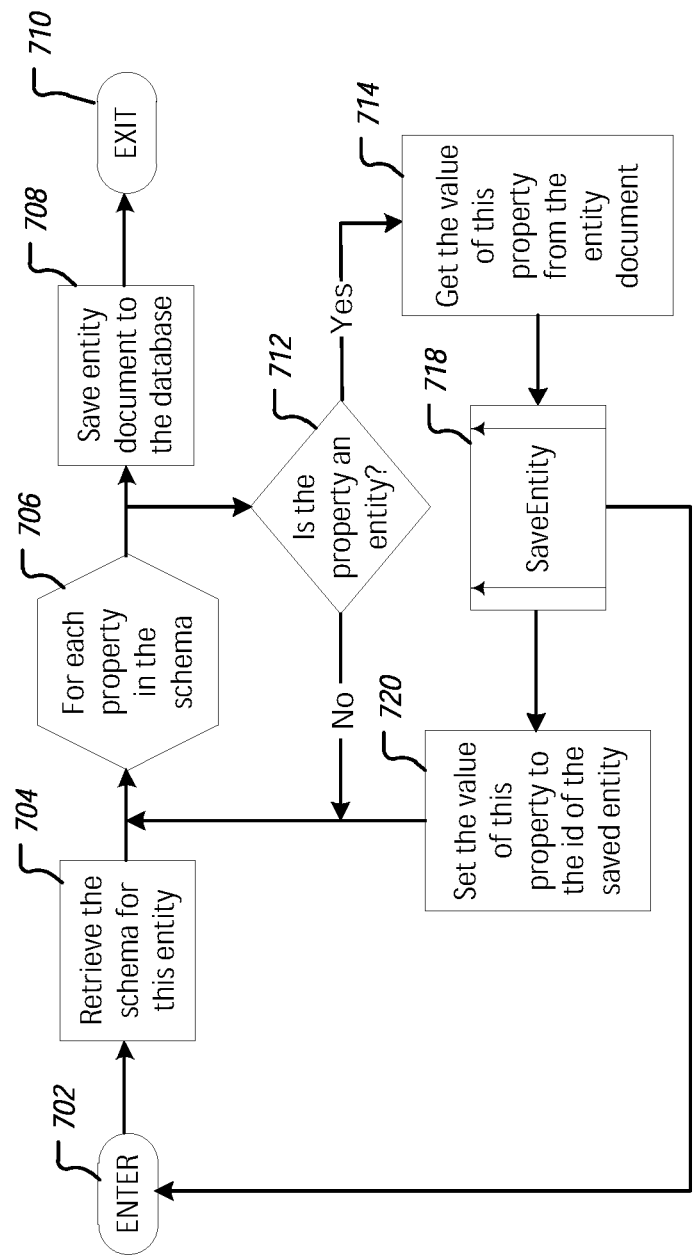
Figure 8:
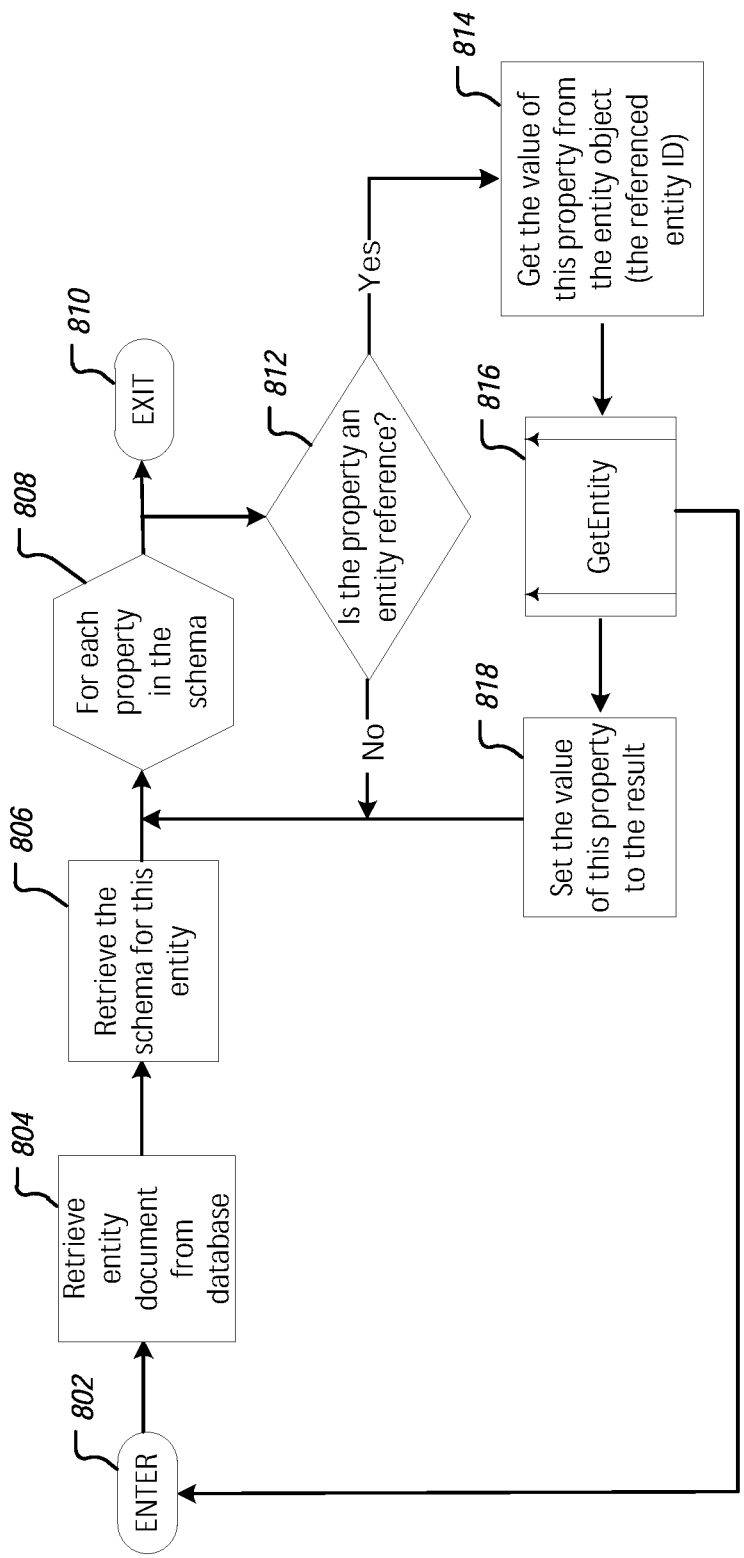

FIGS. 6 through 8 are flow charts representing more details of a process for rapid deployment and execution of customized functionality across multiple distinct platforms in accordance with one embodiment.

Referring to FIGS. 5 through 8 together, the process begins at ENTER OPERATION 602 and proceeds with FOR EACH FIELD IN THE FORM OPERATION 604.

In one embodiment, FOR EACH FIELD IN THE FORM OPERATION 604 is intended to create a loop which processes each field in a form using the processes discussed herein, and once every field in the form being processed has been considered, ends with EXIT OPERATION 606 where the process exits awaiting new input.

Thus, at FOR EACH FIELD IN THE FORM OPERATION 604 a field in the form being considered is selected and examined at IS THIS A CALCULATION FIELD? OPERATION 608.

If, at IS THIS A CALCULATION FIELD? OPERATION 608, a determination is made that the field being examined is a calculation field, process flow proceeds with SET "FIELDTYPE" TO "CALCULATION" OPERATION 610.

In one embodiment, calculation field operations are primarily managed by at least a portion of the set of platform-dependent instructions. For example, if the value of a calculation field is set forth as a sum of a value of a first field and value of a second field, platform-dependent instructions such as rendering engine 128, rendering engine 140 or rendering engine 146 setup and manage the calculation field. Setup and management include establishing one or more event listeners as needed to "listen" for value changes in the first and second fields, and responding to those value changes by updating the value of the calculation field.

Following completion of SET "FIELDTYPE" TO "CALCULATION" OPERATION 610, if there are any additional fields in the form being considered that have not yet been examined, one of those fields that have not yet been examined is selected for consideration and process flow proceeds again with IS THIS A CALCULATION FIELD? OPERATION 608.

If, at IS THIS A CALCULATION FIELD? OPERATION 608, a determination is made that the field being examined is not a calculation field, process flow proceeds with RETRIEVE THE SCHEMA CORRESPONDING TO THE "PATH" PROPERTY OPERATION 612. In the format shown in FIG. 5, the path property of a field is presented as <schema #sub-schema >. However, persons of ordinary skill in the art having the benefit of this disclosure will readily realize that a schema and a sub-schema may be presented in other ways and in other formats as well.

As one example, form field 502 reflects a path having a schema named "PERSON". Thus, when form field 502 is the field being considered and analyzed, the schema retrieved at RETRIEVE THE SCHEMA CORRESPONDING TO THE "PATH" PROPERTY OPERATION 612 is the schema having an identifier of "person".

Once the appropriate schema is retrieved at RETRIEVE THE SCHEMA CORRESPONDING TO THE "PATH" PROPERTY OPERATION 612, process flow proceeds with USING THIS FIELD'S "PATH" PROPERTY, GET THE SUB-SCHEMA FOR THIS FIELD FROM THE RETRIEVED SCHEMA OPERATION 614.

In one embodiment, USING THIS FIELD'S "PATH" PROPERTY, GET THE SUB-SCHEMA FOR THIS FIELD FROM THE RETRIEVED SCHEMA OPERATION 614. In one embodiment, and continuing to use form field 502 as an example, the sub-schema determined at USING THIS FIELD'S "PATH" PROPERTY, GET THE SUB-SCHEMA FOR THIS FIELD FROM THE RETRIEVED SCHEMA OPERATION 614 is "name".

In an alternative example, using form field 504, the schema retrieved at RETRIEVE THE SCHEMA CORRESPONDING TO THE "PATH" PROPERTY OPERATION 612 is a schema having a schema identifier of "officeinfo". Correspondingly, using the same example, the sub-schema retrieved at USING THIS FIELD'S "PATH" PROPERTY, GET THE SUB-SCHEMA FOR THIS FIELD FROM THE RETRIEVED SCHEMA OPERATION 614 is the "eid" sub-schema.

Note that for any given form, such as form 506, the respective fields of the form need not all involve the same schema. Additionally, not all fields of a given form include the same properties, such as title, display path, etc.

Following retrieval of the sub-schema associated with the particular field at USING THIS FIELD'S "PATH" PROPERTY, GET THE SUB-SCHEMA FOR THIS FIELD FROM THE RETRIEVED SCHEMA OPERATION 614, process flow proceeds with DOES THE FIELD DEFINE A "FIELDTYPE" PROPERTY? OPERATION 616.

In one embodiment, at DOES THE FIELD DEFINE A "FIELDTYPE" PROPERTY? OPERATION 616, a determination is made as to whether the field being considered defines a particular field type. If a particular field type is not defined for the field under consideration, process flow proceeds with DETERMINE THE DEFAULT FIELD TYPE FOR THIS FIELD OPERATION 618.

In one embodiment, at DETERMINE THE DEFAULT FIELD TYPE FOR THIS FIELD OPERATION 618 a default field type is retrieved from information in a generalized schema applicable to every form needing a default field type. In one embodiment, at DETERMINE THE DEFAULT FIELD TYPE FOR THIS FIELD OPERATION 618 a default field type is retrieved from data stored in a database, such as database 115. Other methods for determining s default type at DETERMINE THE DEFAULT FIELD TYPE FOR THIS FIELD OPERATION 618 will be known to those of ordinary skill having the benefit of this disclosure.

In one embodiment, following the determination of a default field type at DETERMINE THE DEFAULT FIELD TYPE FOR THIS FIELD OPERATION 618, or alternatively if a determination is made at DOES THE FIELD DEFINE A "FIELDTYPE" PROPERTY? OPERATION 616 that the field being considered already has a particular field type associated with it, process flow proceeds with IS THE FIELD AN ENTITY REFERENCE? OPERATION 620.

In one embodiment, at IS THE FIELD AN ENTITY REFERENCE? OPERATION 620 a determination is made whether the form field being considered is an entity object reference. If, at IS THE FIELD AN ENTITY REFERENCE? OPERATION 620, a determination is made that the form field being considered is an entity object reference, process flow proceeds with SET THIS FIELD'S "ENTITYTYPE" PROPERTY TO THE VALUE OF THE SUBSCHEMA'S ID OPERATION 622.

In one embodiment, and using an example where form field 504 is being considered, the sub-schema's ID is "eid". Therefore, in one embodiment, at SET THIS FIELD'S "ENTITYTYPE" PROPERTY TO THE VALUE OF THE SUBSCHEMA'S ID OPERATION 622, the field's "entitytype" property will be set to the value "eid". Note that schema 508 has two sub-schemas is associated with it, namely "eid" and "hrCode". Further, the sub-schema "eid" has a title and a type associated with it. Thus, when sub-schema "eid" is considered for display in a field, the information will be titled "Employee ID" and will be of type "string" unless the form itself overrides those values by explicitly declaring them within the form. In one embodiment, if a form specifies a characteristic or property of a field directly, that specified characteristic overrides any declaration within a schema.

In one embodiment, following completion of SET THIS FIELD'S "ENTITYTYPE" PROPERTY TO THE VALUE OF THE SUBSCHEMA'S ID OPERATION 622, or following a determination at IS THE FIELD AN ENTITY REFERENCE? OPERATION 620 that the form field being considered is not an entity object reference, process flow proceeds with FOR EACH OF THE FOLLOWING ITEMS, IF THE SCHEMA DEFINES A PROPERTY WITH THAT NAME AND THE FORM DOESN'T, COPY THE VALUE FROM THE SCHEMA TO THE FORM: "TITLE", "HIDDEN", "ENUM", "FORMAT", "DEFAULT", "ITEMS" OPERATION 624.

In one embodiment, and in an example where form field 504 is being considered, the path leads to the "officeinfo" schema and the "eid" sub-schema. Therefore, at FOR EACH OF THE FOLLOWING ITEMS, IF THE SCHEMA DEFINES A PROPERTY WITH THAT NAME AND THE FORM DOESN'T, COPY THE VALUE FROM THE SCHEMA: "TITLE", "HIDDEN", "ENUM", "FORMAT", "DEFAULT", "ITEMS" OPERATION 624, since there is a "title" defined" the name of the property, e.g. "title" and the value of the property "Employee ID" is copied into the platform-independent object being created.

Following completion of FOR EACH OF THE FOLLOWING ITEMS, IF THE SCHEMA DEFINES A PROPERTY WITH THAT NAME AND THE FORM DOESN'T, COPY THE VALUE FROM THE SCHEMA: "TITLE", "HIDDEN", "ENUM", "FORMAT", "DEFAULT", "ITEMS" OPERATION 624, process flow proceeds with USE THE SCHEMA DESIGNATOR OF THE "PATH" PROPERTY TO GET THE CORRESPONDING ENTITY ID FROM THE ENTITY ID MAP OPERATION 626.

In one embodiment, an entity ID map is a lookup table. In one embodiment, an entity map is a combination of two or more lookup tables. For example, an entity map includes, in one embodiment, the value of a given field with an identifier identifying the entity. In one embodiment, when object data of a first object, such as a form object, is related and combined with object data such as an entity object, an entity map is created between the entity identifiers, the value of a field, and any other object data, such as schema names and schema designators relating to the combination. Thus, the "name" field of entity 501 of FIG. 5 has the value "John" and relates to the schema "person" and schema designator "name" of path 502 all of which are related together by an entity ID map.

Following completion of USE THE SCHEMA DESIGNATOR OF THE "PATH" PROPERTY TO GET THE CORRESPONDING ENTITY ID FROM THE ENTITY ID MAP OPERATION 626, process flow proceeds with GETENTITY OPERATION 628.

One process flow diagram in accordance with one embodiment of GETENTITY OPERATION 628 is reflected as a GETENTITY process of FIG. 8.

In one embodiment, the GETENTITY process begins at ENTER OPERATION 802 and proceeds with RETRIEVE ENTITY DOCUMENT FROM DATABASE OPERATION 804. In one embodiment, the retrieved entity object document will be associated with or otherwise mapped to the entity object identified at USE THE "PATH" PROPERTY TO GET THE CORRESPONDING ENTITY ID FROM THE ENTITY ID MAP OPERATION 626. In one embodiment, the entity object document will be retrieved from a database, such as database 115 (FIG. 1). Those of ordinary skill having the benefit of this disclosure will readily appreciate that the entity object document may be stored, and therefore retrieved, from any network accessible location, from a memory or disk location of any computing system or mobile computing device, or from any other data storage location in current existence or otherwise later developed.

In one embodiment, following completion of RETRIEVE ENTITY DOCUMENT FROM DATABASE OPERATION 804, process flow proceeds with RETRIEVE THE SCHEMA FOR THIS ENTITY OPERATION 806.

In one embodiment, at RETRIEVE THE SCHEMA FOR THIS ENTITY OPERATION 806, the appropriate schema for the entity object identified at USE THE "PATH" PROPERTY TO GET THE CORRESPONDING ENTITY ID FROM THE ENTITY ID MAP OPERATION 626 will be retrieved.

In one embodiment, the schema document will be retrieved from a database, such as database 115 (FIG. 1). Those of ordinary skill having the benefit of this disclosure will readily appreciate that the schema document may be stored, and therefore retrieved, at any network accessible location, from a memory or disk location of any computing system or mobile computing device, or from any other data storage location in current existence or otherwise later developed.

In one embodiment, following completion of RETRIEVE THE SCHEMA FOR THIS ENTITY OPERATION 806, process flow proceeds with FOR EACH PROPERTY ON THE SCHEMA OPERATION 808.

In one embodiment, FOR EACH PROPERTY IN THE SCHEMA OPERATION 808 is intended to create a loop which, once every property in the schema being processed has been considered, ends with EXIT OPERATION 810 where the process exits awaiting new input.

In one embodiment, a property in the schema is selected for consideration, and process flow proceeds with IS THE PROPERTY AN ENTITY REFERENCE? OPERATION 812.

In one embodiment, at IS THE PROPERTY AN ENTITY REFERENCE? OPERATION 812, a determination is made as to whether the property being considered is an entity object reference. If yes, process flow proceeds with GET THE VALUE OF THIS PROPERTY FROM THE ENTITY DOCUMENT OPERATION 814. In one embodiment, at GET THE VALUE OF THIS PROPERTY FROM THE ENTITY OBJECT OPERATION 814, the entity object document corresponding to the current entity object being processed is referenced, and the value of the current property being considered, i.e. the referenced entity object id, is retrieved.

In one embodiment, following retrieval of the value of the current property being considered at GET THE VALUE OF THIS PROPERTY FROM THE ENTITY DOCUMENT OPERATION 814 process flow proceeds with GETENTITY OPERATION 816. Thus, the GETENTITY process of FIG. 8 is called again, recursively, and thus begins again, saving the prior progress already made an starting with a new set of variables at ENTER OPERATION 802. Process flow for that additional recursive process will continue as outlined, and when the recursively called process exits at EXIT OPERATION 810, process flow for the original GETENTITY process proceeds with SET THE VALUE OF THIS PROPERTY TO THE RESULT OPERATION 818.

In one embodiment, at SET THE VALUE OF THIS PROPERTY TO THE RESULT OPERATION 818 the value of the property being considered is set to the value of the result of the most recently performed GETENTITY process, such as the most recently performed recursively called instance of the GETENTITY process.

Following completion of SET THE VALUE OF THIS PROPERTY TO THE RESULT OPERATION 818, process flow proceeds again with FOR EACH PROPERTY IN THE SCHEMA OPERATION 808, where a new property in the schema is selected for consideration. If all properties of the schema have been considered, process flow continues with EXIT OPERATION 810.

If, at IS THE PROPERTY AND ENTITY REFERENCE? OPERATION 812, a determination was made that the property being considered is not an entity object reference, process flow proceeds again with FOR EACH PROPERTY IN THE SCHEMA OPERATION 808, where a new property in the schema is selected for consideration. If all properties of the schema have been considered, process flow continues with EXIT OPERATION 810.

Returning to the process flow of FIG. 6, following completion of GETENTITY OPERATION 628, once all recursive calls to the GETENTITY process have completed, process flow proceeds with USING THE "PATH" PROPERTY GET THE EXISTING VALUE FOR THIS FIELD FROM THE ENTITY OPERATION 630.

In one embodiment, at USING THE "PATH" PROPERTY GET THE EXISTING VALUE FOR THIS FIELD FROM THE ENTITY OPERATION 630, the path property associated with the field being considered is used to retrieve a current value for this particular field from the current entity object.

In one embodiment, following completion of USING THE "PATH" PROPERTY GET THE EXISTING VALUE FOR THIS FIELD FROM THE ENTITY OPERATION 630, process flow proceeds with SET THE VALUE PROPERTY OF THIS FIELD TO THE RETRIEVED VALUE OPERATION 632.

In one embodiment, at SET THE VALUE PROPERTY OF THIS FIELD TO THE RETRIEVED VALUE OPERATION 632, the value property for the field currently being considered is set as the existing value for the field under consideration. Following completion of SET THE VALUE PROPERTY OF THIS FIELD TO THE RETRIEVED VALUE OPERATION 632, process flow proceeds with DOES THE FIELD DEFINE A DISPLAY PATH PROPERTY? OPERATION 640.

In one embodiment, at DOES THE FIELD DEFINE A "DISPLAYPATH" PROPERTY? OPERATION 640, a determination is made as to whether the current field being considered defines a "displaypath" property. If so, process flow proceeds with USE THE "DISPLAYPATH" TO GET THE DISPLAYED VALUE FROM THE VALUE OF THIS FIELD OPERATIONS 642.

In one embodiment, at USE THE "DISPLAYPATH" TO GET THE DISPLAYED VALUE FROM THE VALUE OF THIS FIELD OPERATION 642, the "displaypath" for the current field under consideration is used to retrieve the displayed value from the value of the current field under consideration.

In one embodiment, following completion of USE THE "DISPLAYPATH" TO GET THE DISPLAYED VALUE FROM THE VALUE OF THIS FIELD OPERATION 642, process flow proceeds with SET THE "DISPLAYVALUE" OF THIS FIELD TO THE RETRIEVED VALUE OPERATION 644.

In one embodiment, at SET THE "DISPLAYVALUE" OF THIS FIELD TO THE RETRIEVED VALUE OPERATION 644, the display value of the current field under consideration is set to the results of USE THE "DISPLAYPATH" TO GET THE DISPLAYED VALUE FROM THE VALUE OF THIS FIELD OPERATION 642.

In one embodiment, following completion of SET THE "DISPLAYVALUE" OF THIS FIELD TO THE RETRIEVED VALUE OPERATION 644, and/or if at DOES THE FIELD DEFINE A "DISPLAYPATH" PROPERTY? OPERATION 640 the current field under consideration does not define a "displaypath" property, process flow proceeds again with FOR EACH FIELD IN THE FORM OPERATION 604 where a new field in the form is selected for consideration. If all fields of the form have been considered, process flow continues with EXIT OPERATION 606.

The discussion above has been largely focused on presenting a method and system for rapid deployment and execution of customized functionality across multiple distinct platforms which involves particularly flexible processes for retrieving, combining, and displaying data. Additional flexible processes may be used for creating and operating on special views of the data and for saving changes to entity object data.

Referring now to FIG. 7, a method for converting entity object data from a platform-specific object into a platform independent object which can be saved begins at ENTER OPERATION 702 and proceeds with RETRIEVE THE SCHEMA FOR THIS ENTITY OPERATION 704.

In one embodiment, RETRIEVE THE SCHEMA FOR THIS ENTITY OPERATION 704, the appropriate schema for the entity object is retrieved. In one embodiment, the schema document will be retrieved from a database, such as database 1 15 (FIG. 1). Those of ordinary skill having the benefit of this disclosure will readily appreciate that the schema document may be stored, and therefore retrieved, from any network accessible location, from a memory or disk location of any computing system or mobile computing device, or from any other data storage location in current existence or otherwise later developed.

Referring again to FIG. 7, following completion of retrieving the appropriate schema for the entity object being saved at RETRIEVE THE SCHEMA FOR THIS ENTITY OPERATION 704, process flow proceeds with FOR EACH PROPERTY ON THE SCHEMA OPERATION 706.

In one embodiment, FOR EACH PROPERTY IN THE SCHEMA OPERATION 706 is intended to create a loop which, once every property in the schema being processed has been considered, proceeds with SAVE ENTITY DOCUMENT TO THE DATABASE OPERATION 708 during which the save entity document is stored back into the database for later retrieval and use.

In one embodiment, following completion of SAVE ENTITY DOCUMENT TO THE DATABASE OPERATION 708, process flow proceeds with EXIT OPERATION 710 where the process exits awaiting new input.

In one embodiment, at FOR EACH PROPERTY IN THE SCHEMA OPERATION 706, a property in the schema is selected for consideration, and process flow proceeds with IS THE PROPERTY AN ENTITY? OPERATION 712.

In one embodiment, at IS THE PROPERTY AN ENTITY? OPERATION 712, a determination is made as to whether the property being considered is an entity object. If yes, process flow proceeds with GET THE VALUE OF THIS PROPERTY FROM THE ENTITY DOCUMENT OPERATION 714. In one embodiment, at GET THE VALUE OF THIS PROPERTY FROM THE ENTITY DOCUMENT OPERATION 714, the entity object document corresponding to the current entity object being processed is referenced, and the value of the current property being considered, i.e. the referenced entity object id, is retrieved.

In one embodiment, following retrieval of the value of the current property being considered at GET THE VALUE OF THIS PROPERTY FROM THE ENTITY DOCUMENT OPERATION 714 process flow proceeds with SAVEENTITY OPERATION 716. Thus, the SAVEENTITY process of FIG. 7 is called again, recursively, and thus begins again, saving the prior progress already made and starting with a new set of variables at ENTER OPERATION 702. Process flow for that second recursive process will continue as outlined, and when the recursively called process exits at EXIT OPERATION 710, process flow for the original SAVEENTITY process proceeds with SET THE VALUE OF THIS PROPERTY TO THE ID OF THE SAVED ENTITY OPERATION 718.

In one embodiment, at SET THE VALUE OF THIS PROPERTY TO THE ID OF THE SAVED ENTITY OPERATION 718 the value of the property being considered is set to the value of the result of the most recently performed SAVEENTITY process, such as the most recently performed recursively called instance of the SAVEENTITY process.

Following completion of SET THE VALUE OF THIS PROPERTY TO THE ID OF THE SAVED ENTITY OPERATION 718, process flow proceeds again with FOR EACH PROPERTY IN THE SCHEMA OPERATION 706, where a new property in the schema is selected for consideration. If all properties of the schema have been considered, process flow proceeds with SAVE ENTITY DOCUMENT TO THE DATABASE OPERATION 708 during which the save entity document is stored back into the database for later retrieval and use.

In one embodiment, following completion of SAVE ENTITY DOCUMENT TO THE DATABASE OPERATION 708, process flow proceeds with EXIT OPERATION 710 where the process exits awaiting new input.

If, at IS THE PROPERTY AN ENTITY? OPERATION 712, a determination was made that the property being considered is not an entity object, process flow proceeds with SAVE ENTITY DOCUMENT TO THE DATABASE OPERATION 708 during which the save entity document is stored back into the database for later retrieval and use.

In one embodiment, following completion of SAVE ENTITY DOCUMENT TO THE DATABASE OPERATION 708, process flow proceeds with EXIT OPERATION 710 where the process exits awaiting new input.

By decoupling the functionality of the platform-independent instructions and platform-dependent instructions from objects and other portions of the application design, rapid deployment and execution of customized functionality across multiple distinct platforms is thereby enabled. Significant time savings is achieved as a result. Further, schema, form and entity objects may be designed and created by nontechnical persons, thus freeing up the technical persons for higher level complex tasks.

The present invention has been described in particular detail with respect to specific possible embodiments. Those of skill in the art will appreciate that the invention may be practiced in other embodiments. For example, the nomenclature used for components, capitalization of component designations and terms, the properties, property object, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

The processes of the present invention may be stored in memory, on a computer program product, such as a CD, disk drive, DVD, or any other nontransitory media, and then loaded when needed into a memory location for execution by a computing processor.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A system for rapid deployment and execution of customized functionality across multiple distinct platforms comprising:
   a database coupled to a network, the database having stored therein object data of a plurality of objects;
   a set of platform-independent instructions comprising instructions to combine at least a portion of the object data of the plurality of objects into a platform-independent object;
   a set of platform-dependent instructions comprising a set of one or more platform-specific instructions to convert and otherwise perform operations on the platform-independent object using a specific platform type associated with the platform-dependent instructions;
   at least one computing processor, the computing processor configured to communicate with the database over the network; and
   at least one memory coupled to the at least one computing processor, the at least one memory having stored therein instructions which when executed by the at least one computing processor perform a process for rapid deployment and execution of customized functionality across multiple distinct platforms including:
   combining, using at least a portion of the set of platform-independent instructions, the object data of the plurality of objects into a platform-independent object;
   deploying the platform-specific set of instructions to a first platform of the specific platform type of the set of platform-specific instructions;
   converting, by performing at least a portion of the set of platform-dependent instructions on the platform-independent object by the first platform, at least a portion of the platform-independent object into a platform-dependent object; and
   displaying at least a portion of the platform-dependent object by the first platform.

2. The system for rapid deployment and execution of customized functionality across multiple distinct platforms of claim 1 further comprising:
   receiving user input from a user of the first platform changing the platform-dependent object by changing already existing data or adding new data that was not previously associated with the platform-dependent object;
   integrating, by performing at least a portion of the set of platform-dependent instructions by the first platform, at least a portion of the platform-dependent object into the platform-independent object; and
   transferring at least one or more changed or new portions of the platform-independent object to one or more objects of the plurality of objects associated with the user input.

3. The system for rapid deployment and execution of customized functionality across multiple distinct platforms of claim 2 wherein transferring at least one or more changed or new portions of the platform-independent object to one or more entity objects associated with the changed or added user input comprises:
   determining one or more schema objects associated with one or more entity objects associated with the changed or new portions of the platform-independent object;
   transferring, for each property of the schema associated with the changed or new portions of the platform-independent object, the changed or new portions of the platform-independent object into the associated entity object; and
   storing the changed or new portions of the associated entity object.

4. The system for rapid deployment and execution of customized functionality across multiple distinct platforms of claim 1 wherein
   the plurality of objects includes a plurality of form objects; and
   one or more form objects of the plurality of form objects includes a pathname, wherein a pathname includes a schema designator, the schema designator being data identifying a specific schema object of the plurality of schema objects.

5. The system for rapid deployment and execution of customized functionality across multiple distinct platforms of claim 4 wherein
   the pathname further includes a property, where the property includes a property designator, the property designator being data identifying a specific property object of the specific schema object of the plurality of schema objects.

6. The system for rapid deployment and execution of customized functionality across multiple distinct platforms of claim 1 wherein
the plurality of objects includes a plurality of form objects; and
one or more form objects of the plurality of form objects includes a pathname, where a pathname includes a schema designator, the schema designator being data identifying a specific schema object of the plurality of schema objects,
further wherein the pathname further includes a property, where the property includes a property designator, the property designator being data identifying a specific property object of the specific schema object of the plurality of schema objects; and
further wherein one or more property objects further includes characteristic data including one or more of a characteristic title and a characteristic type.

7. The system for rapid deployment and execution of customized functionality across multiple distinct platforms of claim 1 wherein
the plurality of objects includes a plurality of schema objects and one or more schema objects of the plurality of schema objects further include one or more default properties and/or one or more required properties; and
wherein the plurality of objects includes a plurality of form objects and one or more form objects of the plurality of form objects includes a property object having property object data directly corresponding to and overriding one or more of the associated default and/or required properties.

8. The system for rapid deployment and execution of customized functionality across multiple distinct platforms of claim 1 wherein the plurality of objects includes a plurality of form objects and one or more form objects of the plurality of form objects includes a form field type property designating a form field type selected from a group of form field types consisting of:
a drop down field type;
an entity select field type;
a currency field type;
a text area field type;
a barcode field type;
a date picker field type;
a time picker field type;
a multi-select field type;
a number field type;
a switch field type;
a date field type;
a geolocation field type;
a text input field type;
a stepper field type;
a signature field type;
a picture field type;
a text display field type
a checkbox field type;
a yes/no field type; and
a bullet button field type.

9. The system for rapid deployment and execution of customized functionality across multiple distinct platforms of claim 1 wherein the platform-dependent instructions are executed on the first platform and the platform-independent instructions are executed on a second platform.

10. The system for rapid deployment and execution of customized functionality across multiple distinct platforms of claim 1 wherein the platform-independent instructions and the platform-dependent instructions are both executed on the first platform.

11. The system for rapid deployment and execution of customized functionality across multiple distinct platforms of claim 1 further comprising:
wherein the plurality of objects includes at least one entity object having object information;
further wherein the plurality of objects includes at least one entity object having object information, further wherein the process further comprises:
receiving user input including login data;
validating the login data as being of an authorized user;
retrieving authorized user data from the database, the authorized user data including a predetermined form object and a predetermined entity object;
wherein the object information of the at least one entity object includes object information from the predetermined entity object; and
wherein the object information of at least one form object includes object information from the predetermined form object.

12. A computing system implemented method for rapid deployment and execution of customized functionality across multiple distinct platforms comprising:
at least one computing processor, the computing processor configured to communicate with a database over the network, the database having stored therein object data of a plurality of objects; and
at least one memory coupled to the at least one computing processor, the at least one memory having stored therein instructions which when executed by the at least one computing processor perform a process for rapid deployment and execution of customized functionality across multiple distinct platforms including:
combining, using at least a portion of the set of platform-independent instructions, object information of a plurality of objects into a platform-independent object;
deploying the platform-specific set of instructions to a first platform of the specific platform type of the set of platform-specific instructions;
converting, by performing at least a portion of the set of platform-dependent instructions on the platform-independent object by the first platform, at least a portion of the platform-independent object into a platform-dependent object; and
displaying at least a portion of the platform-dependent object by the first platform.

13. The computing system implemented method for rapid deployment and execution of customized functionality across multiple distinct platforms of claim 12 further comprising:
receiving user input from a user of the first platform changing the platform-dependent object by changing already existing data or adding new data that was not previously associated with the platform-dependent object;
integrating, by performing at least a portion of the set of platform-dependent instructions by the first platform, at least a portion of the platform-dependent object into the platform-independent object; and
transferring at least one or more changed or new portions of the platform-independent object to one or more objects of the plurality of objects.

14. The computing system implemented method for rapid deployment and execution of customized functionality across multiple distinct platforms of claim 13 wherein transferring at least one or more changed or new portions of the platform-independent object to one or more entity objects associated with the changed or added user input comprises:
 determining one or more schema objects associated with one or more entity objects associated with the changed or new portions of the platform-independent object;
 transferring, for each property of the schema associated with the changed or new portions of the platform-independent object, the changed or new portions of the platform-independent object into the associated entity object; and
 storing the changed or new portions of the associated entity object.

15. The computing system implemented method for rapid deployment and execution of customized functionality across multiple distinct platforms of claim 12 wherein
 the plurality of objects includes a plurality of form objects; and
 one or more form objects of the plurality of form objects includes a pathname, where a pathname includes a schema designator, the schema designator being data identifying a specific schema object of the plurality of schema objects.

16. The computing system implemented method for rapid deployment and execution of customized functionality across multiple distinct platforms of claim 15 wherein
 the pathname further includes a property, where the property includes a property designator, the property designator being data identifying a specific property object of the specific schema object of the plurality of schema objects.

17. The computing system implemented method for rapid deployment and execution of customized functionality across multiple distinct platforms of claim 12 wherein
 the plurality of objects includes a plurality of form objects; and
 one or more form objects of the plurality of form objects includes a pathname, where a pathname includes a schema designator, the schema designator being data identifying a specific schema object of the plurality of schema objects,
 further wherein the pathname further includes a property, where the property includes a property designator, the property designator being data identifying a specific property object of the specific schema object of the plurality of schema objects;
 further wherein one or more property objects further includes characteristic data including one or more of a characteristic title and a characteristic type.

18. The computing system implemented method for rapid deployment and execution of customized functionality across multiple distinct platforms of claim 12 wherein
 the plurality of objects includes a plurality of schema objects and one or more schema objects of the plurality of schema objects further include one or more default properties and/or one or more required properties; and
 wherein the plurality of objects includes a plurality of form objects and one or more form objects of the plurality of form objects includes a property object having property object data directly corresponding to and overriding one or more of the associated default and/or required properties.

19. The computing system implemented method for rapid deployment and execution of customized functionality across multiple distinct platforms of claim 12 wherein the plurality of objects includes a plurality of form objects and one or more form objects of the plurality of form objects includes a form field type property designating a form field type selected from a group of form field types consisting of:
 a drop down field type;
 an entity select field type;
 a currency field type;
 a text area field type;
 a barcode field type;
 a date picker field type;
 a time picker field type;
 a multi-select field type;
 a number field type;
 a switch field type;
 a date field type;
 a geolocation field type;
 a text input field type;
 a stepper field type;
 a signature field type;
 a picture field type;
 a text display field type
 a checkbox field type;
 a yes/no field type; and
 a bullet button field type.

20. The computing system implemented method for rapid deployment and execution of customized functionality across multiple distinct platforms of claim 12 wherein the platform-independent instructions are executed on a first platform and the platform-dependent instructions are executed on a second platform.

21. The computing system implemented method for rapid deployment and execution of customized functionality across multiple distinct platforms of claim 12 wherein the platform-independent instructions and the platform-dependent instructions are both executed on the same platform.

22. The computing system implemented method for rapid deployment and execution of customized functionality across multiple distinct platforms of claim 12 further comprising:
 wherein the plurality of objects includes at least one entity object having object information;
 further wherein the plurality of objects includes at least one entity object having object information, further wherein the process further comprises:
 receiving user input including login data;
 validating the login data as being of an authorized user;
 retrieving authorized user data from the database, the authorized user data including a predetermined form object and a predetermined entity object;
 wherein the object information of at least one entity object includes object information from the predetermined entity object; and
 wherein the object information of at least one form object includes object information from the predetermined form object.

23. A system for rapid deployment and execution of customized functionality across multiple distinct platforms comprising:
 a database coupled to a network, the database having stored therein a plurality of entity objects each including specific data describing a distinct entity object, a plurality of schema objects each defining a type of entity object and what each type of entity object is allowed to contain, and a plurality of form objects each defining a form, each form object including one or more fields;
 a set of platform-independent instructions comprising instructions to combine form object data of one or more form objects, schema object data of one or more schema objects and entity object data of one or more entities into a platform-independent object;

a set of platform-dependent instructions comprising a set of one or more platform-specific instructions to display and operate on the platform-independent object using a specific platform type associated with the platform-dependent instructions;

at least one computing processor, the computing processor configured to communicate with the database over the network; and at least one memory coupled to the at least one computing processor, the at least one memory having stored therein instructions which when executed by the at least one computing processor perform a process for rapid deployment and execution of customized functionality across multiple distinct platforms including:

combining, using at least a portion of the set of platform-independent instructions, object information of at least one schema object, object information of at least one entity object, and object information of at least one form object into a platform-independent object;

deploying the platform-specific set of instructions to a first platform of the specific platform type of the set of platform-specific instructions;

converting, by performing at least a portion of the set of platform-dependent instructions on the platform-independent object by the first platform, at least a portion of the platform-independent object into a platform-dependent object; and displaying at least a portion of the platform-dependent object by the first platform.

24. The system for rapid deployment and execution of customized functionality across multiple distinct platforms of claim 23 further comprising:

receiving user input from a user of the first platform changing the platform-dependent object by changing already existing data or adding new data that was not previously associated with the platform-dependent object;

integrating, by performing at least a portion of the set of platform-dependent instructions by the first platform, at least a portion of the platform-dependent object into the platform-independent object; and transferring at least one or more changed or new portions of the platform-independent object to one or more entity objects associated with the changed or added user input.

25. The system for rapid deployment and execution of customized functionality across multiple distinct platforms of claim 23 wherein transferring at least one or more changed or new portions of the platform-independent object to one or more entity objects associated with the changed or added user input comprises:

determining one or more schema objects associated with one or more entity objects associated with the changed or new portions of the platform-independent object;

transferring, for each property of the schema associated with the changed or new portions of the platform-independent object, the changed or new portions of the platform-independent object into the associated entity object; and storing the changed or new portions of the associated entity object.

26. The system for rapid deployment and execution of customized functionality across multiple distinct platforms of claim 23 wherein one or more form objects of the plurality of form objects includes a pathname, wherein a pathname includes a schema designator, the schema designator being data identifying a specific schema object of the plurality of schema objects.

27. The system for rapid deployment and execution of customized functionality across multiple distinct platforms of claim 26 wherein the pathname further includes a property, where the property includes a property designator, the property designator being data identifying a specific property object of the specific schema object of the plurality of schema objects.

28. The system for rapid deployment and execution of customized functionality across multiple distinct platforms of claim 27 wherein one or more form objects of the plurality of form objects includes a pathname, where a pathname includes a schema designator, the schema designator being data identifying a specific schema object of the plurality of schema objects, further wherein the pathname further includes a property, where the property includes a property designator, the property designator being data identifying a specific property object of the specific schema object of the plurality of schema objects; and further wherein one or more property objects further includes characteristic data including one or more of a characteristic title and a characteristic type.

29. The system for rapid deployment and execution of customized functionality across multiple distinct platforms of claim 23 wherein one or more schema objects of the plurality of schema objects further include one or more default properties and/or one or more required properties; and one or more form objects of the plurality of form objects includes a property object having property object data directly corresponding to and overriding one or more of the associated default and/or required properties.

30. The system for rapid deployment and execution of customized functionality across multiple distinct platforms of claim 23 wherein one or more form objects of the plurality of form objects includes a form field type property designating a form field type selected from a group of form field types consisting of:

a drop down field type;
an entity select field type;
a currency field type;
a text area field type;
a barcode field type;
a date picker field type;
a time picker field type;
a multi-select field type;
a number field type;
a switch field type;
a date field type;
a geolocation field type;
a text input field type;
a stepper field type;
a signature field type;
a picture field type;
a text display field type
a checkbox field type;
a yes/no field type; and
a bullet button field type.

31. The system for rapid deployment and execution of customized functionality across multiple distinct platforms of claim 23 wherein the platform-dependent instructions are executed on the first platform and the platform-independent instructions are executed on a second platform.

32. The system for rapid deployment and execution of customized functionality across multiple distinct platforms of claim 23 wherein the platform-independent instructions and the platform-dependent instructions are both executed on the first platform.

33. The system for rapid deployment and execution of customized functionality across multiple distinct platforms of claim 23 further comprising:
- receiving user input including login data;
- validating the login data as being of an authorized user;
- retrieving authorized user data from the database, the authorized user data including a predetermined form object and a predetermined entity object;
- wherein the object information of at least one entity object includes object information from the predetermined entity object; and
- wherein the object information of at least one form object includes object information from the predetermined form object.

* * * * *